(12) United States Patent
Broome et al.

(10) Patent No.: US 9,680,689 B2
(45) Date of Patent: Jun. 13, 2017

(54) FRAGMENTING MEDIA CONTENT

(71) Applicants: Allen Broome, Broomfield, CO (US); John Leddy, Bryn Mawr, PA (US)

(72) Inventors: Allen Broome, Broomfield, CO (US); John Leddy, Bryn Mawr, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 232 days.

(21) Appl. No.: 13/767,524

(22) Filed: Feb. 14, 2013

(65) Prior Publication Data
US 2014/0229636 A1 Aug. 14, 2014

(51) Int. Cl.
G06F 15/16 (2006.01)
H04L 29/08 (2006.01)
G06Q 10/06 (2012.01)
H04N 21/845 (2011.01)
H04N 21/2343 (2011.01)
H04N 21/436 (2011.01)
(Continued)

(52) U.S. Cl.
CPC ........ H04L 29/08756 (2013.01); G06Q 10/06 (2013.01); H04N 21/23439 (2013.01); H04N 21/43615 (2013.01); H04N 21/44004 (2013.01); H04N 21/84 (2013.01); H04N 21/845 (2013.01); H04N 21/8456 (2013.01)

(58) Field of Classification Search
CPC .............. G06Q 10/06; H04L 29/08756; H04L 21/23439; H04L 21/43615; H04L 21/44004; H04L 21/84; H04L 21/845; H04L 21/8456; H04N 21/23439; H04N 21/43615; H04N 21/44004; H04N 21/84; H04N 21/845; H04N 21/8456; G06K 9/00718; G06K 9/00765
See application file for complete search history.

(56) References Cited

U.S. PATENT DOCUMENTS

| | | | |
|---|---|---|---|
| 7,380,258 B2* | 5/2008 | Durden et al. | 725/25 |
| 9,209,934 B2* | 12/2015 | Luby | H04N 21/23106 |
| 2001/0032293 A1* | 10/2001 | Korst et al. | 711/112 |

(Continued)

OTHER PUBLICATIONS

Thorsten Lohmar et al: "Dynamic adaptive HTTP streaming of live content", World of Wireless, Mobile and Multimedia Networks (WOWMOM), 2011 IEEE International Symposium on a, IEEE, Jun. 20, 2011 (Jun. 20, 2011), pp. 1-8.

(Continued)

Primary Examiner — Hamza Algibhah
(74) Attorney, Agent, or Firm — Banner & Witcoff, Ltd.

(57) ABSTRACT

Systems and methods relating to fragmenting content based on metadata are disclosed. In one embodiment, metadata is obtained from data that is accessible from an interface. A content descriptor, based on at least a portion of the metadata, may be utilized to determine fragment size. The content descriptor value may be derived from multiple forms of metadata, such as for example, genre, sub-genre, presence of live media, and combinations thereof. The fragments may be either virtual or physically discrete segments or files. In one aspect, the value may be the sole basis for determining the fragment lengths. In another aspect of the embodiment, the division of the content is conducted such that each resultant fragment comprises a single frame type.

23 Claims, 4 Drawing Sheets

(51) Int. Cl.
*H04N 21/44* (2011.01)
*H04N 21/84* (2011.01)

(56) References Cited

U.S. PATENT DOCUMENTS

| | | | |
|---|---|---|---|
| 2002/0107968 A1* | 8/2002 | Horn | H04L 12/1881 709/230 |
| 2002/0136217 A1* | 9/2002 | Christensen | H04L 29/06027 370/393 |
| 2002/0164024 A1* | 11/2002 | Arakawa et al. | 380/210 |
| 2003/0056010 A1* | 3/2003 | Kaars | 709/246 |
| 2003/0069881 A1* | 4/2003 | Huttunen | G06F 17/30896 |
| 2003/0110501 A1* | 6/2003 | Rafey | G11B 27/105 725/46 |
| 2004/0161154 A1* | 8/2004 | Hua | G06K 9/00711 382/229 |
| 2004/0202191 A1* | 10/2004 | Vrabel | H04L 47/10 370/412 |
| 2006/0143650 A1* | 6/2006 | Tanikawa | G06F 17/30787 725/38 |
| 2007/0226810 A1* | 9/2007 | Hotti | 726/30 |
| 2007/0239881 A1* | 10/2007 | Schneider | H03M 7/30 709/231 |
| 2007/0299870 A1 | 12/2007 | Finch | |
| 2008/0037864 A1* | 2/2008 | Zhang et al. | 382/156 |
| 2010/0115123 A1* | 5/2010 | Airamo | 709/234 |
| 2010/0218213 A1* | 8/2010 | Park et al. | 725/40 |
| 2013/0138693 A1* | 5/2013 | Sathish et al. | 707/784 |
| 2013/0239145 A1* | 9/2013 | Broome | G06Q 50/01 725/41 |
| 2013/0268761 A1* | 10/2013 | Giladi | 713/170 |
| 2013/0294526 A1* | 11/2013 | Thornberry | 375/240.25 |

OTHER PUBLICATIONS

Stefan Lederer et al: "Dynamic adaptive streaming over HTTP dataset", Proceeding MMSYS '12 Proceedings of the 3rd Multimedia Systems Conference, Jan. 1, 2012 (Jan. 1, 2012), p. 89.
"Adaptive Streaming Ad Insertion—Modifying Playlists to Deliver Targeted Ads Using HTTP Adaptive Streaming", RGB Networks, 2011, XP002722836, Retrieved from the Internet: URL:http://www.rgbnetworks.com/pdfs/Adaptive_Bitrate_Ad_Insertion_White_Paper_0911-01.pdf [retrieved on Apr. 4, 2014].
Extended European Search Report—EP14155032.7—Mailing Date: Apr. 22, 2014.
Zambelli, Alex; "IIS Smooth Streaming Technical Overview;" Microsoft Corporation, Mar. 2009 (17 pages).
European Office Action—EP Application 14155032.7—dated Sep. 28, 2015.

* cited by examiner

|  | Media Content 302 | Live 304 | Genre 306 | Sub-Genre 308 | Descriptor #1 330 | Descriptor #2 332 |
|---|---|---|---|---|---|---|
| 310 | Sporting Event #1 | YES | Sports | Football | LIVE | 1 |
| 312 | Sporting Event #2 | YES | Sports | Golf | LIVE | 2 |
| 314 | TV Program #1 | YES | Reality TV |  | LIVE | 1 |
| 316 | TV Program #2 | NO | Reality TV | Interactive | LIVE | 1 |
| 318 | TV Program #3 | NO | Sitcom |  | NOT LIVE | 3 |
| 320 | Movie #1 | NO | Movie | Comedy | NOT LIVE | 4 |
| 322 | Movie #1 | NO | Movie | Action | NOT LIVE | 5 |
| 324 | Movie #3 | NO | Movie | Drama | NOT LIVE | 4 |

Fig. 3

FRAGMENTING MEDIA CONTENT

The features described herein relate generally to the delivery of content. Some aspects relate to fragmenting and delivering media content based upon metadata associated with the media content.

BACKGROUND

Media content is often transmitted via packet-switched networks, such as the Internet, and other small or large area networks. Most media content, including movies, television shows, and music are too large to be transmitted as a single fragment. Further, consumers often prefer to access content without downloading the complete asset. Therefore, various algorithms are used to divide media and related data into individual fragments for transmission. Several factors may impact fragment size; however, it is primarily dictated by specific efficiencies for the utilized network(s). Delivering media according to network efficiency has several disadvantages. For example, it does not account for packets containing live content. Even if certain fragments are flagged as important or urgent, other disadvantages persist with current methodologies. For example, a minimum quantity of fragments may be required to be received in one or more caches associated with the end-user's playback device, before initiating playback of the content.

Delivery of content representing real-time or live events becomes increasingly unsatisfactory as the requirements for packets increase. Indeed, as content becomes more interactive, content is often consumed on a real-time basis. For example, many systems require a minimum of three or more fragments to be cached before playback of the media is initiated. If each fragment is three seconds in duration, then the viewer will be at least than nine seconds delayed from real-time. This results in an unsatisfactory experience for viewers of, for example, quick-paced sporting events, interactive shows, such as reality shows with voting options, as well as other types of media. This problem is compounded when a media player is located in a location with several other devices consuming the same or similar content. For example, an entity may transmit or present to viewers a sporting event in which several, (e.g., three) sources are utilized at different display devices throughout an establishment. Different network capabilities coupled with different fragment sizes often results with at least a portion of the devices showing the live event out of synchronization, for example, several seconds and up to a minute behind other devices. This is often distracting and undesirable to entities and users.

Further, other forms of content, such as media, movies, music, and teleconferencing entertainment multimedia is often transmitted using the same or similar sized fragments as media containing real-time and/or live media. In this regard, bandwidth requirements may be unduly elevated. Therefore, there is a need for a scalable solution that allows for different types of media content to be transmitted.

SUMMARY

Aspects of the disclosure relate to identifying attributes of media content before access or transmission, such as via a content delivery system. The attributes may be received from metadata, which may be used to determine fragment length. In one embodiment, metadata generally attributable to the content as a whole (or with the entire portion of the content) may be utilized in the determination of fragment size. The metadata may be obtained from an external source, yet in other embodiments, the metadata may already be associated or otherwise linked to the media content. In one embodiment, the metadata, or a portion thereof, may be configured to be accessible from a user interface, such as, for example, an electronic program guide (EPG). In one such embodiment, additional resources or expenses of obtaining and/or formatting metadata may be avoided. In another aspect, a content descriptor, based on at least a portion of the metadata associated with the media content, may be utilized to determine a fragment size.

Further aspects relate to dividing or fragmenting the media content into a plurality of ordered fragments. The fragments may represent a linear portion (or representation thereof) of the of the media content. The fragmentation may be virtual, such as a digital flag or marker to identify locations in a single continuous file and/or on a non-transitory memory. Yet in other embodiments, the fragmentation may create individual discrete fragments, segments, or files before transmission of the media. In one embodiment, the content is divided into equally sized fragments as a function of time. The fragmentation may be based, at least in part, on a content descriptor value associated with the content. In certain embodiments, the content descriptor may apply to the whole content (e.g., a sporting event, a comedy show, etc.) and not independent to a portion thereof. In some embodiments, the content descriptor may be the sole basis for the fragment lengths of the content.

In one embodiment, the content descriptor value may relate to whether the media content comprises real-time (inclusive of on-demand and/or interactive content) or live material or relates to a live or ongoing event. In another embodiment, the content descriptor value may relate to one or more genres associated to the media content. Illustrative genres may include, but are not limited to: sports, news, sitcom, reality, action, talk show, teleconference multimedia, or the like. In other embodiments, genres or categories may distinguish between content comprising media relating to: live events, interactive events, and/or on-demand content. In certain embodiments, a first content descriptor value may be derived from multiple forms of metadata, such as for example, genre, sub-genre, presence of live media, and combinations thereof.

Further aspects relate to the structure of the fragments. In one embodiment, division of the media content may be conducted such that each resultant fragment comprises a single i-frame. Yet in further embodiments, fragments may comprise multiple i-frames. In certain embodiments, the content descriptor further determines the quantity of i-frames within each fragment. Various implementations may be performed on media content that has already been transcoded into packets, such as an existing MPEG-4 file.

Other details and features will also be described in the sections that follow. This summary is not intended to identify critical or essential features of the inventions claimed herein, but instead merely summarizes certain features and variations thereof.

BRIEF DESCRIPTION

Some features herein are illustrated by way of example, and not by way of limitation, in the figures of the accompanying drawings and in which like reference numerals refer to similar elements.

FIG. 3 is an illustrative chart providing a visual depiction of possible sources of metadata that may be utilized in accordance with an exemplary embodiment;

DETAILED DESCRIPTION

In the following description of the various embodiments, reference is made to the accompanying drawings, which form a part hereof, and in which is shown by way of illustration various embodiments in which the invention may be practiced. For example, aspects described herein provide a content transcoding and/or delivery system through which content may automatically be fragmented and/or transcoded based upon a content descriptor value. Additionally, various systems and methods may perform the automatic fragmenting/transcoding based upon certain criteria, which in certain embodiments, may be performed without user instruction or specification from user devices. It is to be understood that other embodiments may be utilized and structural and functional modifications may be made without departing from the scope of the present disclosure.

Figure 1:
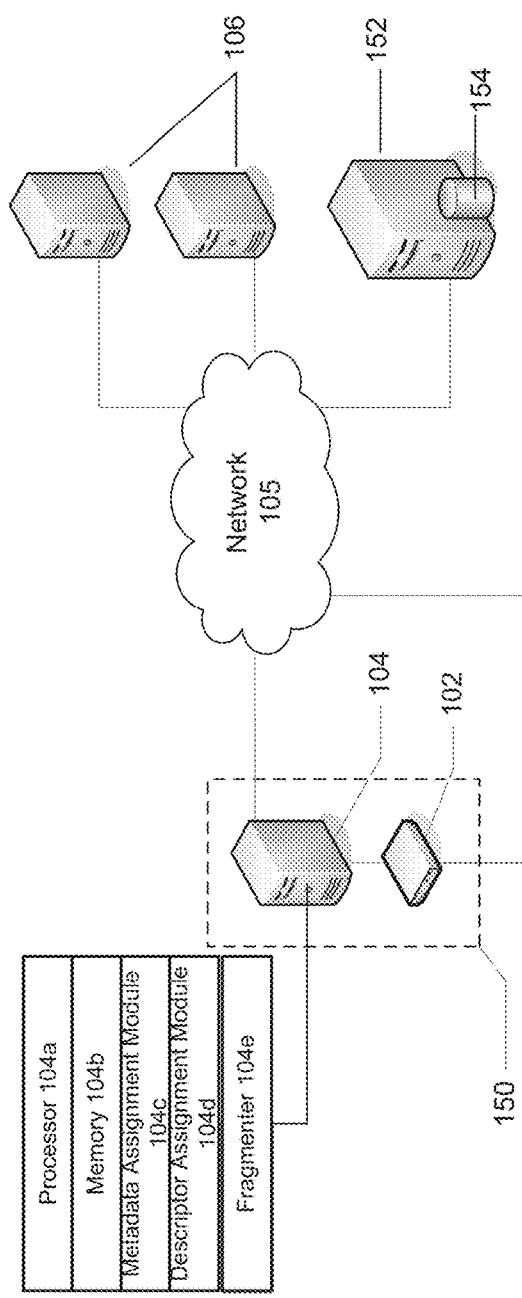
FIG. 1 illustrates an example network in accordance with an aspect of the disclosure.
Figure 1:
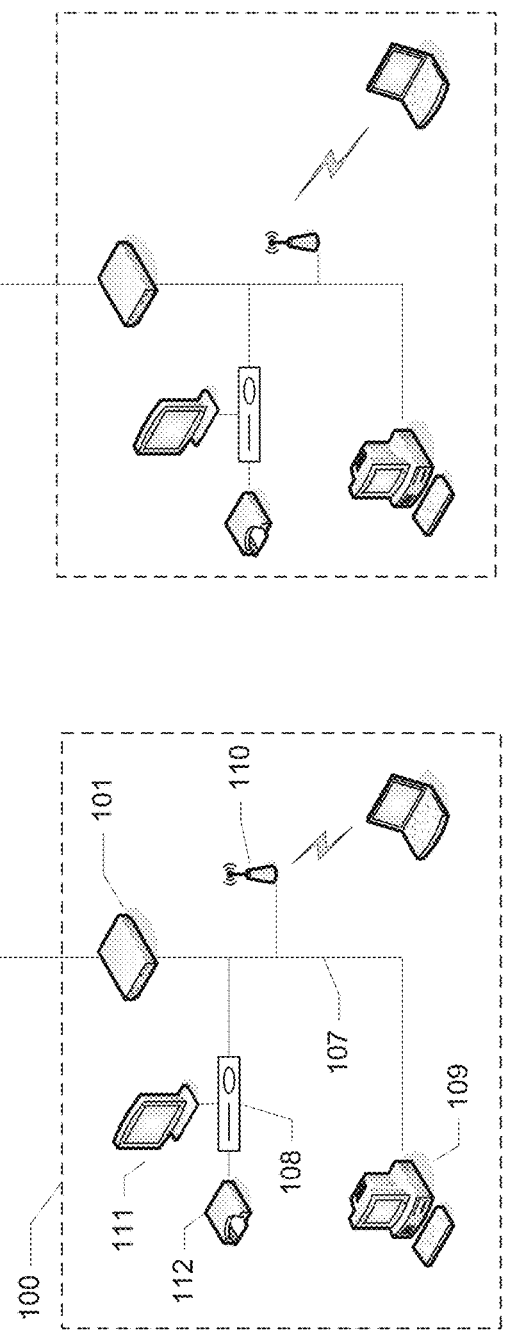

FIG. 1 illustrates an example content (e.g., data, media, information, services, etc.) distribution network that can be used to access various types of information, such as video content (movies, pay-per-view, etc.), audio content, Internet data, etc . . . in accordance with an aspect of the disclosure. Starting with a user's location 100 (or any other location), the user may have a network interface device or gateway 101. Gateway 101 may be a device (such as a coaxial cable modem, optical fiber modem, etc.) that is configured to communicate with another corresponding device 102 via intermediate communication links 103. The nature of the devices 101/102 may depend on the type of communication links 103 being used. For example, links 103 may be coaxial cables, in which case the modems 101/102 may be a coaxial cable modem and a cable modem termination server, respectively. Other types of links may be used as well, such as optical lines, hybrid fiber/coaxial cable (HFC), satellite, cellular telephone, local Wifi wireless, WIMAX, etc. . . . , and different corresponding types of interface devices 101/102 may be used.

Device 102 may be located external to the location 100, such as at a service provider's central server 150 or facility (eg., a headend, a processing facility, etc.). Device 102 may communicate with one or more other servers 104, which may in turn be connected to an even larger communication network 105. Communication network 105 may be any desired type of network, such as a wide area network (WAN), cellular telephone, satellite network, Internet, Intranet, etc., and may offer connection to even more servers 106. Those other servers 106 may, in turn, provide various types of services such as delivery of media content, and Internet purchasing. As shown, links 103 may be part of communication network 105 in a configuration that does not require presence of central server 150.

In an embodiment, data corresponding to services may be transmitted and received from device 102, central server 150, and/or one or more servers 106. Service data may include broadcast data (e.g. television broadcast programming), narrowcast data (e.g. VOD and switched digital video (SDV) programming) and unicast data (e.g. high speed data (HSD) service providing Internet connectivity to users and VoIP or other type of telephone service). The backbone network may be, e.g. a service operator's national IP network, the Internet, and some combination of the Internet and a service operator's network.

Within location 100, gateway 101 may allow any device in the home to access device 102 and, in turn, any of the other servers 104/106 and network 105. To provide this connectivity, gateway 101 may be connected to one or more in-home communication networks 107 (e.g., in-home coaxial cable, MoCA (Multimedia Over Coax Alliance), Ethernet, power line network, etc.). Other devices, such as a media interface device 108 (e.g., set-top box, digital video recorder, mobile television, television, mobile terminal, etc.), computer 109, or wireless access point 110 may also be connected to the in-home network, and may use the network to communicate with gateway 101. In some embodiments, location 100 may be a home, yet in other embodiments it may be a business establishment. In still further embodiments, it may be any location capable of receiving and/or transmitting electronic data. Location 100 may have multiple gateways, and in other embodiments, some or all of the gateways may be integrated into the various devices described herein. So, for example, video interface device 108 may include gateway 101, but to simplify the present discussion, FIG. 1 discusses media interface device 108 and gateway 101 separately.

The devices of location 100 may use gateway 101 for any variety of purposes, such as accessing the Internet, accessing servers 106, etc. Some devices, such as media interface device 108, may use gateway 101 to receive media content that is then displayed on a display device such as a television, mobile device, or computer monitor 111.

To provide secure access to that content, the supplier of the content (e.g., a content server 106, or server 104), may through the service provide a license to the user to receive and access various media content. In addition, the service provider may also encrypt the content when delivering it to gateway 101 and media interface device 108. Media interface device 108 may need to decrypt the content before displaying it on the display device 111 (which may be integrated with the media interface device 108 in some embodiments).

This decryption may be performed by media interface device 108 using a hierarchy of keys one of which may be a device key that is stored within media device 108. Alternatively, the decryption may be performed by an external security module 112, such as a smart card, that is provided separately to the user. Having the separate smart card 112 may allow customers to purchase media devices 108 from a source other than the content provider, and to merely obtain a small card from the content provider.

Figure 2:
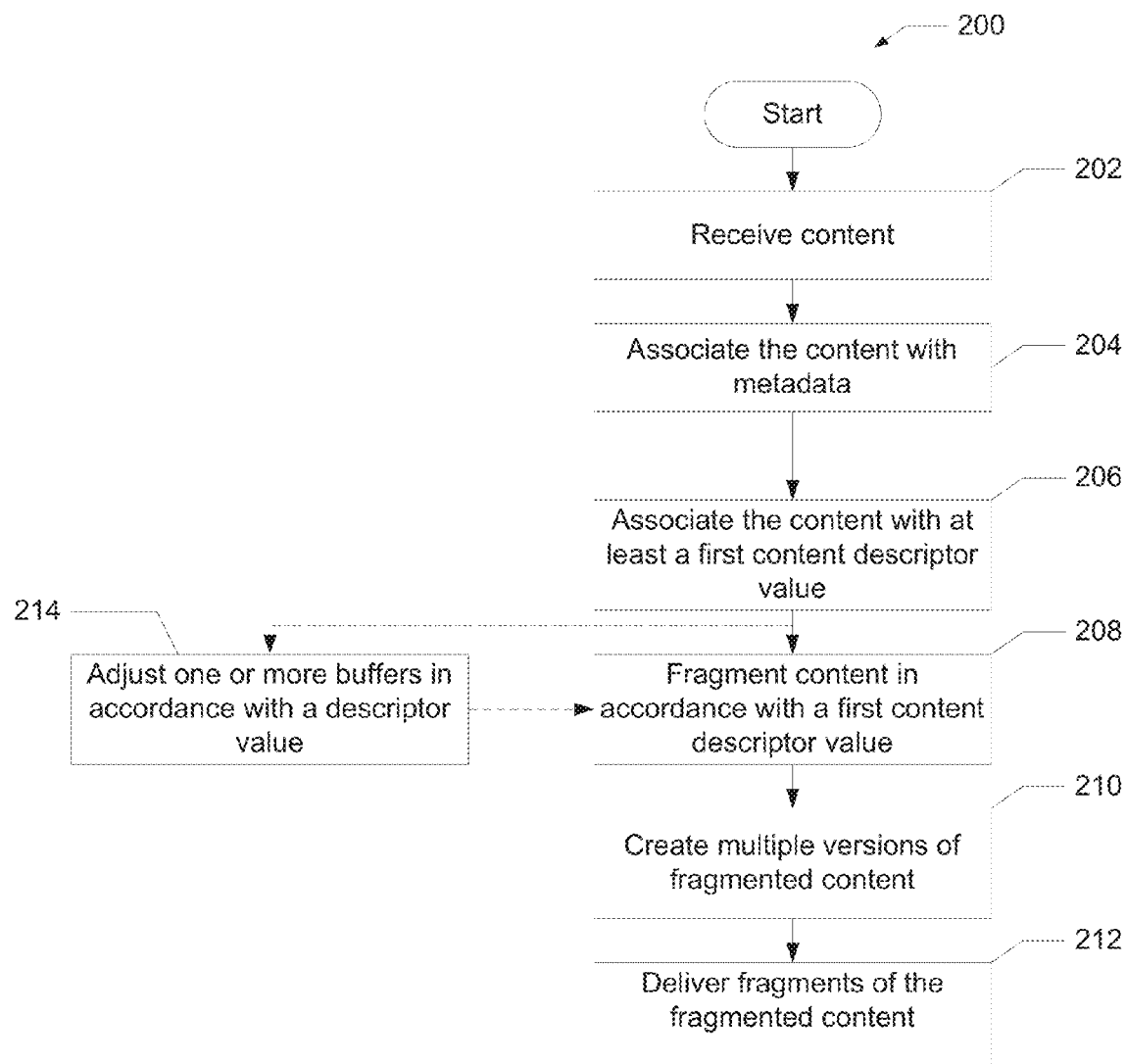
FIG. 2 is a flowchart of an illustrative method of fragmenting content in accordance with an exemplary embodiment.

FIG. 2 is a flowchart of an illustrative method that may be utilized in accordance with an embodiment of this disclosure. As seen in flowchart 200, media content may be received from a media content source (see, e.g., block 202). In one embodiment, it is contemplated that the media content source may comprise a satellite reception facility, such as would be in operative communication with central server 150, however, in other embodiments, the media content may originate or otherwise be received from a variety of content providers including television broadcast companies, Internet content providers, other users, user-generated content sites (i.e., YouTube®), and the like. The media content may be, but is not limited to: a movie, a television show, a public announcement, an audio recording such as a song or a speech, or combinations of any of these and other forms of media. In one embodiment, media content may be received at a central office, such as central server 150, and/or servers 106 for initial processing. Yet in other embodiments, the media content may comprise previously transcoded media, such as for example, an MPEG-4 file or groups of files, which may or may not comprise associated metadata.

Block 204 may be implemented to associate the received content with content metadata/attribute information including, for example, information relating to: genre, sub-genre, time of the content creation (i.e., is it live?), time of scheduled delivery, format of the content (e.g., high definition (HD) vs. standard definition (SD), 1080i, 1080p, 720p) and the like. Such descriptive information may be retrieved from a separate or integral database such as programming guide database 154, located on server 152. The content metadata may be obtained from the media itself, such as metadata located within an MPEG stream, from a third party service, and/or from one or more users. In one embodiment, a metadata assignment module, such as module 104c of server 104 (within central server 150) may be utilized in one or more processes relating to associating metadata with media content, including any processes in relation to block 204. Module 104c may be operatively connected to processor 104a and memory (a non-transitory computer-readable medium) 104b. In one embodiment, memory 104b may store the associated metadata or a portion thereof. In other embodiments, memory 104b may store information linking metadata with the media content.

In one embodiment, information such as a description or commentary (which may be located on programming guide database 154) of the media may be parsed to extract keywords that may be used as the content descriptor, or in the assignment or formation of the content descriptor. Parsing may include removing articles, transition words and the like that are likely to be non-descriptive in nature. Remaining words may then be compared to a database of known descriptive words such as artist, actor or author names, content genres (e.g., sports, talk shows, sitcoms, reality shows, news), or subcategories of the such genres (e.g., types of sports like football or basketball). The known descriptive words may then be stored as keywords in association with the fragmented media content (or media content to be fragmented). Other methods of parsing and identifying keywords may be used to associate keywords and search terms with content items and content item fragments. For example, if the commentary includes audio description or comments, methods of speech recognition and parsing may be used to convert the audio to text, store the text and identify keywords from the converted text.

FIG. 3 shows illustrative media content associated with various fields of metadata in accordance with various aspects of the disclosure. Specifically, chart 300 of FIG. 3 provides a visual depiction of possible sources of information (i.e., metadata) that may be utilized to associate or assign a content descriptor to media content. Those skilled in the art with the benefit of this disclosure will appreciate that chart 300 is merely a visual depiction and there is no requirement for generating any charts, table or other collections of data associating media content (such as the illustrative examples of media content provided in column 302) with metadata (such as the illustrative metadata of columns 304-308).

Looking to chart 300, column 304 provides an indication whether the media content comprises a live event, such as a sporting event. For example, both Sporting Event #1 (row 310) and Sporting Event #2 (row 312) are flagged under column 304 as containing media from a live or on-going event. Determination of whether the media content relates to a live event may be determined from a field indicating the time the media content was captured. Further metadata may include genre (see, e.g., column 306) which may categorize media content based upon a myriad of factors. In certain embodiments, metadata relating to a sub-genre (see, e.g., column 308) may be utilized. For example, if media content 310 and 312 each are categorized in the "Sports" genre, then using a sub-genre may further sub-classify media content 310 as being a football game and media content 312 as being a golf game. Those skilled in the art will readily understand that the genres and sub-genres are merely illustrative examples and that any other categories may be utilized without departing from the scope of this disclosure, including the claims. In this regard, a category that is listed as a "sub-genre" in one embodiment may be a "genre" in another embodiment. Furthermore, live events may be a type of genre or sub-genre. Additional features of FIG. 3 are explained immediately below in relation to content descriptor values.

Aspects of this disclosure relate to assigning a content descriptor value to the media content (see block 206 of FIG. 2). In certain embodiments, the content descriptor may be automatically obtained from existing metadata. In one embodiment, a specific field or value utilized in an EPG may be utilized as the content descriptor. In one embodiment, central server 150 and/or server 152 may comprise information utilized for an EPG that contains at least a portion of the metadata utilized in the selection or creation of a content descriptor value. For example, programming guide database 154 may contain or otherwise receive or have access to metadata regarding the media content received at block 202. In yet other embodiments, at least a portion of metadata may be contained within a segmentation descriptor, such as for example SCTE-35 segmentation descriptor that marks program boundaries. In one embodiment, a descriptor assignment module, such as module 104d of server 104 (within central server 150) may be utilized in one or more processes relating to assigning a content descriptor with the media content, including any processes in relation to block 206. Module 104d may be operatively connected to processor 104a and memory (a non-transitory computer-readable medium) 104b. In one embodiment, memory 104b may be configured to store the assigned descriptor value or information relating to the descriptor value. In other embodiments, memory 104b may store computer-executable instructions, that when executed by a processor, such as processor 104a, cause the processor to assign the content descriptor value using one or more rules. Exemplary rules are provided later in this disclosure.

The dividing of the media content into fragments may be based, at least in part, on a first content descriptor value associated with and generally attributable to the media content as a whole and not a content descriptor of a particular fragment that resulted from the division. For example, a live sporting event may have non-live advertising materials, such as commercials, inter-dispersed throughout the media content. Nonetheless, the entire media content may accurately be classified as both "live" and "sports". Further, one or more fields of metadata may be utilized, either individually or in combination with each other or other factors, to divide or fragment the media content. In one embodiment, the content descriptor value assigned to media content may be directly obtained from a single field or value of metadata.

For example, because both Sporting Event #1 and #2 are within the "LIVE" category (see column 304) they may both receive the same content descriptor regardless of any other metadata (such as, for example, genre 306 or sub-genre 308). Therefore, column 330 shows that in one embodiment each of them receives the same content descriptor ("Live"). In contrast, media content 318 through 324 are not live and therefore, will receive a different content descriptor (see column 330). Although the illustrative content descriptor is alphabetic text, those skilled in the art will realize that any indicium that differentiates one descriptor from another descriptor is within the scope of this disclosure. Further, there is no requirement that the content descriptor be separately generated from existing metadata. Rather, existing metadata, such as information from column 304 may serve as the content descriptor. In other embodiments, the content descriptor may be separately generated from the metadata. This may be helpful in embodiments in which, for example, a higher level of categorization may be desired. Further examples and rules for associating a content descriptor with media content are discussed in relation to block 408 below.

Based upon the above examples shown in column 330, the media content (310-324) may be divided or fragmented into a plurality of ordered fragments representing a linear representation of the media content received at block 202 (see, e.g., block 208 of FIG. 2). As used herein, any reference to "dividing" or "fragmenting" media or portions of media encompasses virtual as well as physical division. For example, in one embodiment, a single file may be "divided" or "fragmented" without repositioning or otherwise separating data representative of the media within the file. Further, in certain embodiments, block 208 or similar methods may be utilized to virtually divide or fragment media content; however, the media content is not actually fragmented until a later time, such as upon delivery. As one example, a media file (such as for example, a MPEG-4 file) may be a single contiguous file while in a "stored" state, on a tangible, non-transitory computer-readable medium, however, may be a plurality of fragments" when being transported in a "transport" state.

In one embodiment, a fragmenter, such as fragmenter 104e of server 104 (which may be part of or within central server 150) may be utilized in one or more processes relating to fragmenting the media content, including any processes in relation to block 208 of FIG. 2. Certain embodiments may transmit and/or receive information to ensure transcoding of the content is correct. For example, information may be provided to adjust a media transcoder based upon the determined fragmentation scheme. In one embodiment, systems and methods may ensure that the transcoder properly encodes the Group of Pictures (GOPs) for the determined fragment size. In this regard, a single fragment may comprise a single GOP, yet in other embodiments, a fragment may comprise a multiple GOPs. In one embodiment, non-live content may be assigned a larger fragment size relative to fragments for non-live content. In this regard, more efficient encoding may be obtained. As an example, using available encoding schemes, a single I-frame is often provided at the beginning of each fragment; therefore, using a larger fragment (such as for non-live content) will require a lower the bit rate necessary for the same quality.

Module 104e may be operatively connected to processor 104a and memory (a non-transitory computer-readable medium) 104b. In one embodiment, memory 104b may be configured to store one or more of the fragments. In other embodiments, memory 104b may store information relating to locations within files or segments where "virtual" fragments are located. In yet further embodiments, memory 104b may store computer-executable instructions, that when executed by a processor, such as processor 104a, cause the processor to fragment the files or segments.

Figure 4A:
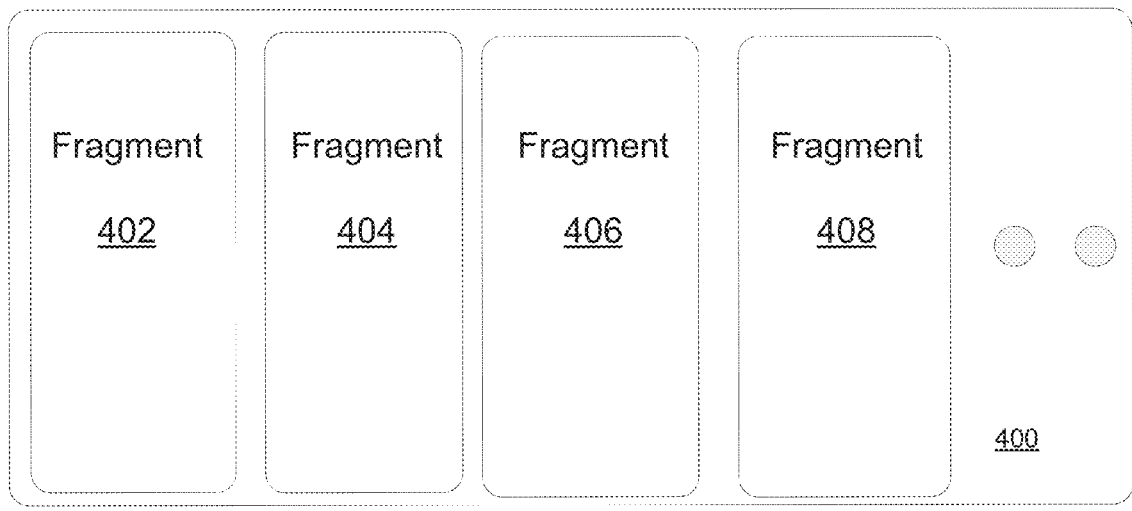
FIG. 4A shows a first illustrative fragment of content in accordance with one exemplary embodiment.
Figure 4B:
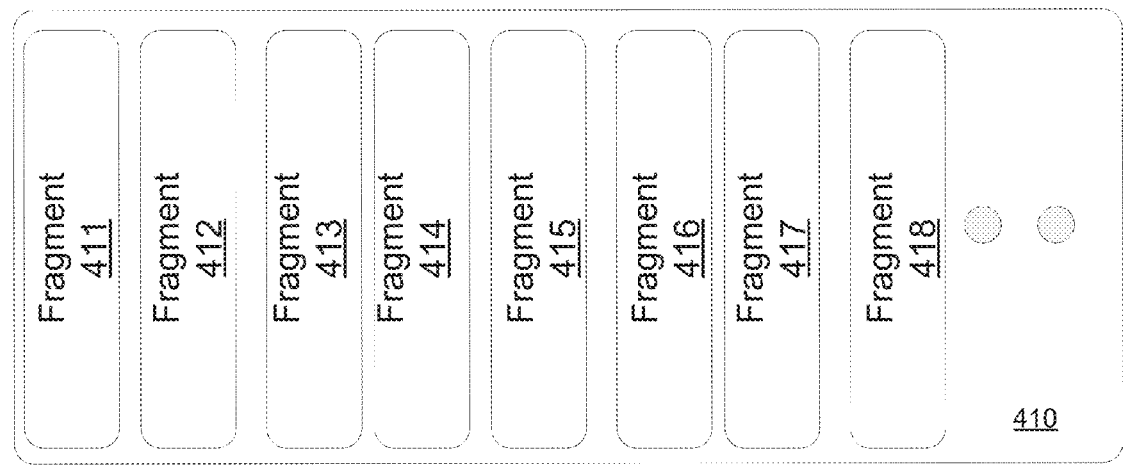
FIG. 4B shows a second illustrative fragment of content in accordance with another exemplary embodiment.

In various embodiments, the plurality of fragments of specific media content may exhibit a consistent packet length as a function of time. FIG. 4 shows illustrative examples of media fragments that exhibit a consistent packet length as a function of time in accordance with various aspects of the disclosure. Specifically, FIG. 4A shows media content 400 divided into multiple fragments 402-408 that each may have a consistent time interval of content (e.g., media), such as for example, 2 seconds, in accordance with an exemplary embodiment. FIG. 4B shows content (e.g., media content) 410 divided into fragments 411-418 that each have a consistent different time interval (e.g. 1 second) of media in accordance with an exemplary embodiment. Therefore, media content 400 and 410 may each be referred to as fragmented files.

Fragmented files 400 and 410 graphically illustrate certain aspects of various embodiments and, for clarity reasons, omit certain elements of files or segments of files, such as for example, headers and metadata. Further, although FIG. 4 provides illustrative examples in the form of files in which each of the fragments are within a contiguous file, those skilled in the art will appreciate that other implementations may not require the media content to be stored as a single file, but rather may be stored across multiple files and/or computer-readable mediums.

As shown in FIG. 4A, fragmented file 400 may correspond, for example, to media content 318 of FIG. 3 which did not comprise a live event and thus was assigned a content descriptor of "NOT LIVE" in column 330. As shown, fragmented file 400 contains fragments 402-408. Together, fragments 402-408 form approximately eight seconds of linear media. Thus, each of the four fragments (402-408) contains approximately two seconds of media. In this regard, fragmented file 400 exhibits consistent packet length as a function of time.

FIG. 4B shows a similarly fragmented file 410, which may correspond in one embodiment to "Sporting Event #1" shown in row 310. Because Sporting Event #1 is a live event, the assigned content descriptor for this example was "LIVE." (see, column 330). As shown in FIG. 4B, fragmented file 410 contains fragments 411-418. Together, fragments 411-408 form approximately eight seconds of linear media. Thus, each of the eight fragments (411-418) contains approximately one second of media. Therefore, like file 400, file 410 also exhibits consistent packet length as a function of time. Instead of providing two-second intervals of media like fragments 402-408, however, fragments 411-418 of file 410 each provide a one-second interval of media. This fragmentation can be independent of any other aspect of the files, including bit rate, display ratio, or other features. In this regard, fragments 402-408 may provide substantially the same amount of media (i.e., eight-seconds) as fragments 411-418.

Before discussing further examples of different embodiments, certain advantages that may be realized from the using content descriptors to provide different sized fragments will be briefly discussed. As discussed previously, packetized video delivery systems generally require a predefined quantity of fragments to be cached before initiating playback of media though user devices, such as the user devices shown in FIG. 1. This requirement may assist in managing a client side playout buffer and ensuring a consistent experience. In the case of live events, however, users often want a real-time experience rather than waiting for the fragments to reach the minimum cache requirements. In many systems, a client will be multiple fragments behind. For instance, the Microsoft® Smooth (Silverlight) player currently requires 3 fragments to be cached. Thus, if each fragment is 3 seconds in duration, then the closest you can get to real time is 9 seconds delayed. Therefore, if content descriptor 330 indicates that the media content is "LIVE" then the applicable media content (i.e., content 310-314) may be fragmented into fragments that correspond to 1 second interval of the media. Therefore, the delay is 33% of the original time difference if the 3-second fragment was used.

The fragmentation may be performed during the transcoding or conversion of the media content. In certain embodiments, the format and/or transcoding techniques may be conducted, based in part, on an appropriate content format for delivery to one or more user devices for consumption at a user's location such as a home, office or vehicle or a remote location. Converting the content may include encoding the content according to a content format such as MPEG-4, FLASH and the like and adapting the content to a predefined bit rate and/or resolution. The content delivery system may further process the content for delivery according to one or more transport protocols such as MPEG Transport Streams (TS), IP datastreams, mobile content delivery protocols and the like. The content may be processed according to multiple different transport protocols to account for different types of networks and devices (e.g., set-top boxes may receive MPEG TS transmissions while IP-enabled devices may be configured to receive IP datastreams).

As mentioned above, multiple fields or forms of metadata may be utilized in the assignment of the content descriptor. The following examples are explained in context with Descriptor#2 shown in column 332 of FIG. 3. Rule 1, provided below considers the values from a live field of metadata (i.e., column 306) as well as a Genre field of metadata (i.e., column 308).

Rule 1: If LIVE=YES and Genre=Sports, then Descriptor=1 second intervals.

Other rules, however, may utilize the sub-genre in combination with the Genre. For example, users who watch live football games may wish to watch the game as close to real time as possible, while those who watch rounds of golf may want to be a bit closer to real time but don't want to overly sacrifice possible consistencies in the broadcast, therefore, Rule 2 may be utilized:

Rule 2: If LIVE=YES and Genre=Sports, then look to Sports Sub-Genre. If Sub-Genre=Football, then Descriptor=1 second intervals. If Sub-Genre=Golf, then Descriptor=2.

This is shown in Column 332. Further, as shown in relation to media content 316-324, the content does not have to include live media for the fragment length to be adjusted. For example, both TV Programs #1 and #2 are reality TV programs (see, Column 306), however, content 314 comprises live content, whereas content 316 does not. Nonetheless, the sub-genre for media 316 indicates its "Interactive" and therefore, providing users the media a few seconds before traditional reception methods may have a more enjoyable experience.

Individuals receiving media content comprising movies (such as media content 320-324) generally are less adamant that their movie starts immediately and more concerned about the overall viewing experience when compared other media content, such as a sporting event or sitcom. Therefore, certain embodiments may utilize metadata providing such information in determining the fragment size.

Certain types of movies, such as for example, action movies (see, e.g., row 322), may be fragmented to have a longer fragment duration than other types of movies (see, e.g., rows 320 and 324). In this regard, this disclosure should not be limited to only decreasing the fragment size, but in certain embodiments, aspects of this disclosure may be utilized to increase fragment size for media content based on content descriptors. In the case of movies for example, expanding the fragment size from 2-3 second intervals to 5-8 second intervals may result in less network traffic as well as a better viewing experience for the user. Those skilled in the art will appreciate that media content fragments often include headers and other data packets in addition to the media that will be provided as audio and/or video. Thus, in certain implementations, using larger fragments decreases the overall quantity of bandwidth required to transmit the same movie or other media using a larger quantity of smaller fragments.

Further, certain protocols utilize different compression techniques. For example, video information of multimedia content is often compressed into a variety of "frames." Some frames allow for greater compression, thus allowing for decreased bandwidth requirements. Other frames are not as compressible, however, offer certain advantages. For example, "i-frames" are less compressible than "p-frames", however, i-frames don't require other frames for decoding purposes. Therefore, the user can randomly access points of the media at i-frame locations. P-frames (as well as B-frames) require other frames for decoding, but use less bandwidth to transmit. Certain aspects of this disclosure, relate to the placement of frames within fragments. This may be especially useful to conserve valuable bandwidth while ensuring an enjoyable experience for the user of the media content.

In one embodiment, users of the media content comprising the football game of Sporting Event #1 may wish to rewind a portion of the media content to see an instant replay. Having additional i-frames in the fragments may assist in permitting users to locate the exact position of a key play and be able to readily navigate to that location. Therefore, using the content descriptor and/or other metadata to determine the frequency of i-frames may be beneficial. Other media for example, such as a teleconference, may not require nearly as many i-frames for user satisfaction, therefore, less frequent usage of i-frames results in more compression and reduced use of bandwidth. In certain embodiments, each fragment may be formed to have a single i-frame as the initial frame. Therefore, if the content descriptor for live events dictates that 1-second intervals are created, then there may be 1 i-frame per interval. Yet other embodiments may utilize multiple i-frames per fragment.

At block 210, multiple versions of specific media content (i.e., Sports Event #1 shown in row 310 of FIG. 3) may be created. The creation of additional versions may be performed prior to, during, or following transmission or storage of a first version of the same media content. In one embodiment, Sports Event#1 may be transcoded such that the fragments are 1-second intervals of media form a first version and then transcoded such that the fragments are 2-second intervals of media. Different versions may be transmitted to different users. For example, the first version may be for transmission to a sports Pay-Per-View channel and the other is set for archival purposes or a scheduled rerun later that day. Further, nothing in this disclosure prohibits the creation of different files or the like having different bitrates or other characteristics. For example, multiple files that each have the same fragment length may be created in which one file contains the media (i.e., the sporting event) in a format suitable for playback at 1080i while a second file contains the same media in a format suitable for playback at 480p. In yet other embodiments, both the fragment length and other characteristics differ among multiple different fragmented files. As long as one file (or segment) is fragmented in accordance with a content descriptor that is generally attributable to the media, multiple different combinations are possible without departing from the scope of this disclosure.

Block 212 or similar method may be implemented to transmit the fragmented media content (i.e., fragmented files 300 and 310 shown in FIG. 3). For example, the fragmented content may be transmitted to one or more user devices through an appropriate network (e.g., cellular networks, the Internet or other WANs, LANs, etc.). In some arrangements, the content may be held by the content delivery system until a scheduled delivery time (e.g., a broadcast or transmission time defined by a program guide). Yet in other embodiments, it may not be delivered until requested by a user.

In this regard, fragmentation of one or more files may be performed during the delivery or availability of the media. This would be especially advantageous, for example, when delivering live content, such as for example, sporting events. The content may be delivered to one or more requesting users through associated user devices. In other examples, the content may be delivered to all user devices known to a content delivery system, such through a multicast distribution system, or to user certain devices selected by the content delivery system based on parameters specified by the content source and/or a provider operating the content delivery system.

Prior to, concurrently with and/or after delivery of the content to user devices (such as those shown in FIG. 1), the content delivery system may further record the content into one or more network storage devices or archives (e.g., servers 106). The recording or storage process may include, for example, an initial fragmentation process, as illustrated in block 208 of FIG. 2, which may fragment the media content into fragments having different lengths than those provided to users during the initial transmission of the fragmented media content.

Further aspects of this disclosure relate to dynamically adjusting one or more buffers. In one embodiment, the dynamic adjustment may be performed based upon one or more descriptor values, such as for example, a content descriptor value. In certain embodiments, a content descriptor value may be automatically obtained from existing metadata associated with content. In one embodiment, a specific field or value utilized in an EPG may be utilized as the content descriptor. In one embodiment, central server 150 and/or server 152 may comprise information utilized for an EPG that contains at least a portion of the metadata utilized in the selection or creation of a content descriptor value. For example, programming guide database 154 may contain or otherwise receive or have access to metadata regarding the media content received at block 202. In yet other embodiments, at least a portion of metadata may be contained within a segmentation descriptor, such as for example a SCTE-35 segmentation descriptor that marks program boundaries. In another embodiment, a descriptor assignment module, such as module 104d of server 104 (within central server 150) may be utilized in one or more processes relating to assigning a content descriptor with the media content, including any processes in relation to block 206.

In certain embodiments, a communication pathway between a content source (i.e., non-transitory medium(s) comprising media content) and a destination of the content may have one or more buffers that may be dynamically adjusted. Dynamic adjustment of one or more buffers may be performed in addition to and/or instead of fragmenting content according to descriptor values, such as described throughout this disclosure (see, e.g., optional block 214). In further embodiments, fragment length may be utilized in any determinations relating to adjusting one or more buffers. For example, as discussed above, block 208 may be utilized to create fragments of content. Thus, certain embodiment, may utilize the fragment lengths of the fragments created in block 208 in any determinations. Those skilled in the art, therefore, will understand that optional block 214 may be initiated before, during, and/or after blocks 206 and/208 and that the illustrative embodiment is merely one example.

Regardless whether a content descriptor value, such as that obtained or derived from an EPG, fragment size, a combination thereof, or other inputs are utilized, exemplary adjustment may include but are not limited to: whether to adjust a buffer, which buffer(s) to adjust, an amount of adjustment, duration of an adjustment, and combinations thereof. In one embodiment, a device at user location 100, such as gateway 101 and/or an electronic device (e.g. computer 109) may have a default buffer value. Default buffers may be useful to deal with network latency/jitter. However, under certain embodiments, one or more default values may be adjusted for the reception of certain content. For example, upon requesting or receiving content, a content descriptor, fragment size, and/other variables may indicate that the content includes live content, for example a sporting event that is currently taking place. Therefore, in one embodiment, based upon the content descriptor value, the buffer on at least one device, such as gateway 101 and/or computer 109, may be set to a lower value. For example, a default buffer value may be set to 20 seconds and may be adjusted to 2 seconds in accordance with one embodiment.

Although example embodiments are described above, the various features and steps may be combined, divided, omitted, and/or augmented in any desired manner, depending on the specific secure process desired. This patent should not be limited to the example embodiments described, but rather should have its scope determined by the claims that follow. For example, although the above-referenced examples provide illustrative examples in the content of media files and fragments, those skilled in the art with the benefit of this disclosure will realize that the teachings of this application is not limited to media. Rather, this disclosure encompasses implementation of the novel methods and systems disclosed herein for the transmission, reception, and utilization of any form of data.

We claim:

1. A method comprising:
   receiving content, by a computing device;
   associating the content with metadata attributable to the content, wherein the metadata comprises information about at least one of a genre or a presence of live media;
   determining an interval based on the information and at least one rule; and
   dividing the content into a plurality of ordered fragments representing a linear representation of the content such that each of the plurality of ordered fragments has a same length corresponding to the interval, wherein the plurality of ordered fragments satisfies a threshold number of fragments.

2. The method of claim 1, further comprising:
storing the plurality of ordered fragments as a single contiguous media file, wherein the plurality of ordered fragments exhibit a consistent packet length as a function of time.

3. The method of claim 1, wherein the metadata is retrieved from an electronic program guide.

4. The method of claim 1, wherein the content comprises a single file and the interval is derived from metadata located within the single file.

5. The method of claim 1, wherein the content is a first content relating to a sports genre and comprises a live event that is assigned a first interval, the method further comprising:
receiving second content relating to a movie genre and not comprising a live event; and
dividing the second content into a second plurality of fragments each having a length corresponding to a second interval, wherein the second interval is longer as a function of time relative to the first interval.

6. The method of claim 1, wherein the dividing results in each of the plurality of ordered fragments having a single i-frame.

7. The method of claim 1, further comprising determining a quantity of i-frames within each of the plurality of ordered fragments.

8. The method of claim 6, wherein the content comprises a previously transcoded MP4 file.

9. The method of claim 1, wherein the threshold number of fragments is a minimum number of fragments required to be received in a cache prior to initializing playback of the content.

10. A method comprising:
receiving content and metadata associated with the content, the metadata comprising information about at least one of a genre or a presence of live media;
determining an interval based on the information and at least one rule; and
dividing, by a computing device, the content into a plurality of ordered fragments representing a linear representation of the content, wherein each of the plurality of ordered fragments has a length corresponding to the interval, the plurality of ordered fragments satisfy a threshold number of fragments, and wherein the plurality of ordered fragments have a consistent packet length as a function of time.

11. The method of claim 10, further comprising:
storing the plurality of ordered fragments on a non-transitory computer-readable medium as a single contiguous media file.

12. The method of claim 10, wherein the dividing results in each of the plurality of ordered fragments having a single i-frame.

13. The method of claim 10, wherein the interval further determines a quantity of i-frames within each of the plurality of ordered fragments.

14. The method of claim 10, wherein the metadata is retrieved from an electronic program guide.

15. The method of claim 10, wherein the threshold number of fragments is a minimum number of fragments required to be received in a cache prior to initializing playback of the content.

16. A method comprising:
associating content with metadata attributable to the content, wherein the metadata comprises information about at least one of a genre or a presence of live media;
determining an interval based on the information and at least one rule;
dividing, by a computing device and based on the interval, the content into a plurality of ordered fragments representing a linear representation of the content, and wherein the plurality of ordered fragments exhibit a packet length as a function of time; and
dynamically adjusting a maximum size of at least one buffer utilized in a transmission of the content.

17. The method of claim 16, wherein the dynamically adjusting of the maximum size of the at least one buffer is based upon at least one of: the metadata, the packet length, and combinations thereof.

18. The method of claim 16, wherein a portion of the metadata is contained within a segmentation descriptor.

19. The method of claim 18, wherein the segmentation descriptor comprises a SCTE-35 segmentation descriptor.

20. The method of claim 16, wherein the at least one buffer comprises a buffer of a gateway device.

21. The method of claim 20, wherein the gateway device is located at an end-user location.

22. The method of claim 16, wherein the at least one buffer comprises a buffer of a destination device that the content is configured to be transmitted to for consumption.

23. The method of claim 17, wherein the at least one buffer comprises a first buffer and a second buffer, wherein the first buffer is adjusted based upon at least a portion of the metadata and the second buffer is adjusted based upon the packet length.

* * * * *